Figure 2:
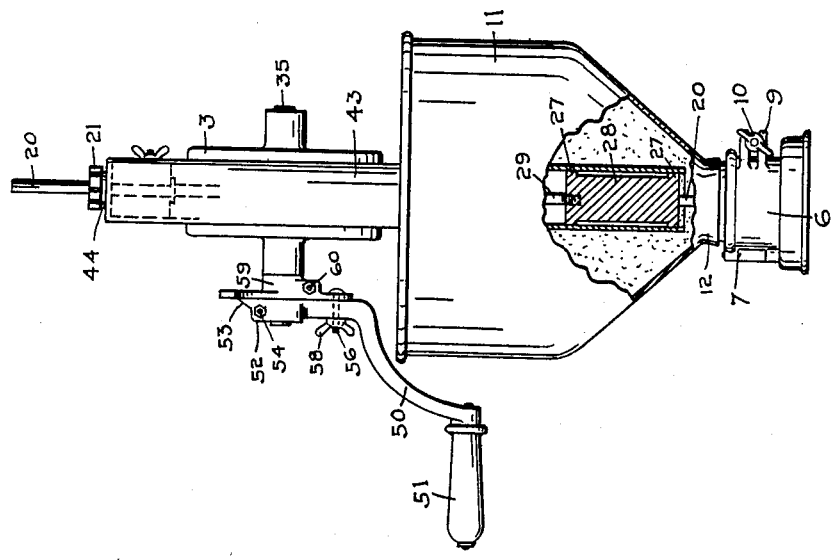

May 16, 1933. W. BELSHAW 1,909,449
DOUGHNUT MACHINE
Filed Nov. 14, 1928 2 Sheets-Sheet 1

INVENTOR
Walter Belshaw
BY
J. L. Rivers,
ATTORNEY

May 16, 1933.　　　　　W. BELSHAW　　　　　1,909,449
DOUGHNUT MACHINE
Filed Nov. 14, 1928　　　2 Sheets-Sheet 2
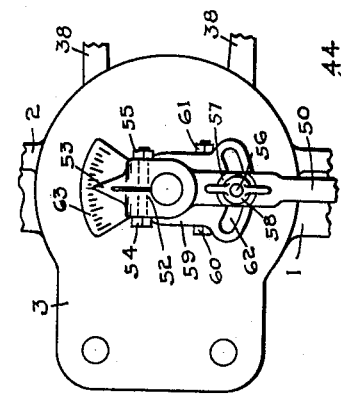
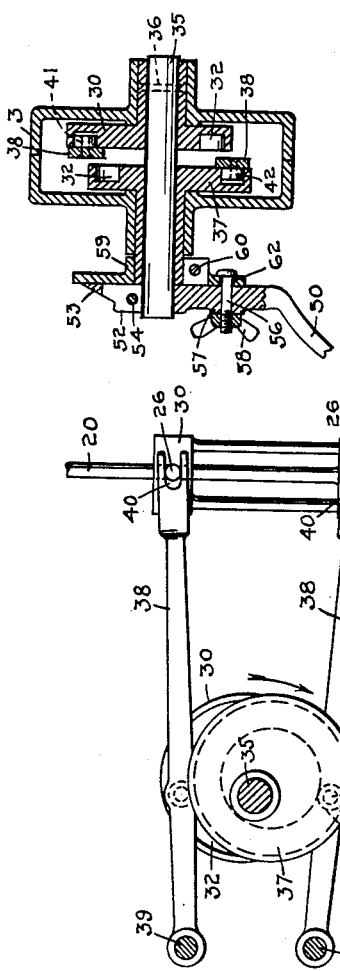
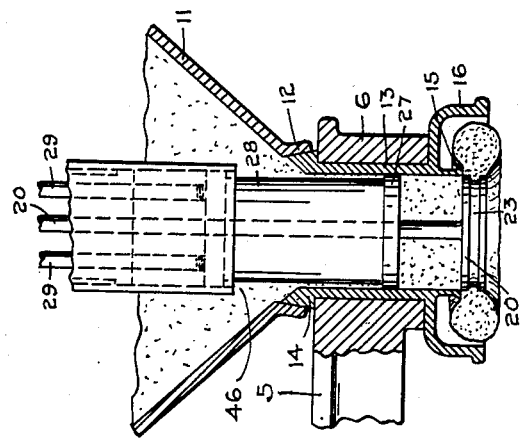
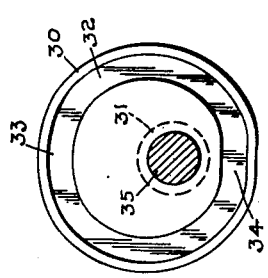
INVENTOR
*Walter Belshaw*
BY *J. L. Rivers*
ATTORNEY Patented May 16, 1933

1,909,449

UNITED STATES PATENT OFFICE

WALTER BELSHAW, OF SEATTLE, WASHINGTON

DOUGHNUT MACHINE

Application filed November 14, 1928. Serial No. 319,244.

My invention relates particularly to improvements in the type of doughnut machines disclosed in my pending application for Letters Patent of the United States, Serial No. 171,662, filed February 28, 1927, and wherein a pair of spaced and cam-actuated pistons operate in conjunction with a hopper and a cylinder connected thereto, whereby, in cooperation with other instrumentalities, a raw doughnut may be formed and deposited in a receptacle for cooking.

One disadvantage arising from the construction of said machines resides in the fact that one of the pistons and the rods connecting both pistons operate within the hopper, and come in direct contact with the dough disposed therein, with the result that the dough particularly adjacent to said moving parts receives a manipulation and kneading which affects adversely the leavening properties of the dough, and renders the doughnuts finally produced tougher and less palatable than would be the case if the dough mixture retained the form as originally provided. This is especially noticeable unless the user is careful to provide a mixture particularly adapted to overcome the effects of said parts in their movements, as referred to.

One object of my invention is, to eliminate said disadvantage, and in furtherance of which I provide a piston sleeve, extending longitudinally of the hopper and spaced away from the discharge end thereof, and an elongated piston, which supersedes one of said pair of pistons, said piston and its rods and the rod connecting another piston being operable within the sleeve, and the sleeve providing a housing for the rods which keeps them separated from the dough in the hopper. The elongated piston, while separated from the dough by the sleeve for the major portion of its travel, comes in contact with the dough adjacent the discharge end of the hopper, but its construction is such, as will appear, as to permit it to slide back and forth through said dough without injuriously manipulating or kneading it. The sleeve thus cooperates with the parts mentioned in allowing dough to be discharged from the hopper virtually in its original condition, as a mixture.

Another object is, to provide a simpler and more efficient cam adjusting mechanism for varying the spacing between the pistons, and thereby regulating the quantity of dough to be acted upon by the pistons at each operation.

A still further object is, to provide a detachable cylinder for the discharge end of the hopper, which will permit a cylinder of different diameter in its body portion to be easily inserted, and which, in cooperation with other interchangeable parts, will enable the machine to form raw doughnuts of different diameters.

And further, such objects, advantages and capabilities as will later more fully appear.

In the accompanying drawings—

Figure 1:
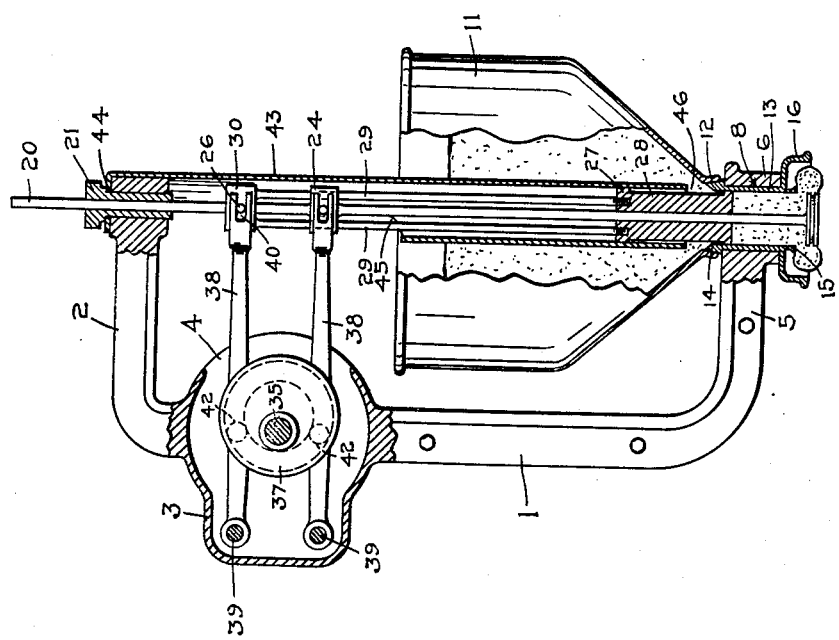

Figure 1 is a sectional side elevation of the device complete, the hopper and other parts being broken away;

Fig. 2, a front elevation of the same, the hopper being partly broken away;

Fig. 3 is a side elevation showing one of a pair of cams adjusted in a position beyond the other, including the cam levers as connected up with the rods of said pistons; said rods being shown in broken sections, and connections of the cams and levers in cross section;

Fig. 4, a vertical section of the cam assembly and driving mechanism, the handle for actuating the cams being broken away;

Fig. 5, a side elevation of the cam adjusting means, the cam levers and the body of the device being shown in broken sections;

Fig. 6, a detail view, partly in cross section and broken away, particularly illustrating the piston cylinder and the position of the lower one of a pair of pistons as it is ready to move upwardly for cutting off a raw doughnut;

Fig. 7, a front elevation of one of said cams, the shaft on which it is excentrically mounted being shown in cross section, and a sleeve on the reverse side, with which it is provided, being indicated by dotted lines;

Fig. 8, a view, in elevation, partly broken away and in cross section, showing said detachable cylinder; and, Fig. 9, a side elevation of said piston sleeve.

Referring more particularly to the drawings, the body of the device comprises a pair of castings having complementary portions which define, when aligned and bolted together, a supporting handle 1, an upper arm 2, a casing 3, disposed therebetween, in which the cams and levers are housed, and a slot 4, through which said levers operate. The castings also provide a lower arm 5, disposed approximately parallel with said upper arm, and a member 6, hingedly secured to one-half of the arm, as at 7, affords in combination with an integral portion of the other half, a socket 8, circular in cross section and located adjacent the free end of the arm 5. The member 6 is held in closed position by the supporting elements, denoted as 9, which operatively carry the winged nut 10.

A hopper 11 for dough, is provided at its lower end with a circular discharge port, having an interiorly beveled section 12. A piston cylinder, detachably connected with the hopper, is provided with a cylindrical body portion 13, carrying at one end a beveled section 14, adapted to frictionally engage the beveled section of said port, and at the other end an outwardly extending and circumferential flange 15 having, preferably, a thin edge, which a flared guard member 16, integral with said cylinder and disposed therearound, is designed to protect when the device is in use or being moved. As will be obvious, the hinged member 6 permits the piston cylinder, and the parts it carries, to be readily detached from the hopper and the device, and will be instrumental in demounting the hopper.

A piston rod, denoted as 20, is slidably mounted in the upper arm through a bushing 21, clampingly secured in said arm as indicated in Fig. 2, the rod carrying at its lower end a piston 22 fixedly secured thereto, said piston being provided with a circumferential groove 23, the purpose of which will hereinafter appear. A block 24, having adjacent each end a bore-like opening 25, and on each side a centrally located and laterally extending pin 26, is fixedly secured to said piston rod, as indicated more particularly in Fig. 3. A second piston, having end portions 27, each of the same diameter as the first piston, is elongated in form, and is reduced in diameter intermediately of the end portions, as at 28. A pair of piston rods, each designated as 29, are fixedly secured to the last-named piston and likewise fastened to a block 30 having on each side a pin identical with those disposed on the first block, and each are consequently given the same numerical designation, 26. The last-named piston and block slidably engage the piston rod 20, and the pair of piston rods 29 slidably engage the block 24, through said openings 25.

A cam 30, is provided on one side of its body portion with an integral and excentrically disposed sleeve 31, and on the other side with a cam groove 32, Fig. 7. Said groove in its general form is circular, certain arcs of which, concentric with the axis on which the cam is designed to rotate, being formed into rests, designated as 33 and 34 respectively. Said cam is journaled in the casing and secured to and rotatable with a shaft 35, extending therethrough, by the pin 36, as shown in Fig. 4. A second cam 37, of the same construction as the first cam and its parts denoted by the same numerals, is likewise mounted in the casing and in spaced relation with the cam 30, the cam 37, however, being clamped, as will be detailed, to the driving mechanism.

A pair of cam levers, each designated as 38, are pivotally mounted within the casing, as at 39, and extend out of the casing through the slot 4. The free end of each is bifurcated and provided with parallel slots 40 designed to straddle the pins 26 of the blocks heretofore referred to. Each of said levers carries a laterally disposed and fixedly secured pin 41, preferably of hardened steel, on which is mounted a roller 42 adapted to fit into and revolve in the groove 32 of each cam. The pins 41 should each be of a length which will approximate the thickness of the roller installed thereon and permit it to operate freely, and as the free terminal thereof is disposed inwardly of the adjacent groove, each roller may be simply slipped on its pin, the pivotal connections 39 of the cam levers cooperating to hold them in place. As is evident, the levers and parts just described, serve to link up the cams with the pistons.

A piston sleeve 43, having an apertured top portion 44 and a cut-out section 45, is secured to the arm 2 by the head of the bushing 21, which bushing is disposed through said portion, and said sleeve extends centrally of the hopper, its free end being spaced away from the discharge port thereof, as at 46, to afford a passage for dough from the hopper to said port. Said cut-out section affords free play to said blocks and the free ends of the cam levers when they and the piston rods are operatively mounted in the sleeve, as indicated in Fig. 1. The elongated piston is designed to operate within and beyond the lower and open end of the sleeve, its end portions 27 slidably engaging the sleeve when disposed therein, and the reduced section 28 affording, obviously, less frictional contact with the sleeve than if the piston were of the same diameter from end to end. The sleeve, as thus mounted, serves to separate said piston for a portion of its travel, and the rods of both pistons, from the dough disposed in the hopper, as will more particularly appear.

To afford convenient means for adjusting one cam relative to the other for varying the spacing between the pistons and thus predetermining the amount of dough to be acted upon by the pistons at each operation, I provide an improved construction, as heretofore referred to, in connection with the driving mechanism. The same consists of a crank 50, terminating at one end in a handle 51, and at the other end in a split portion 52 and a pointer 53, the portion 52 encircling the shaft 35 and clamped thereto by the bolt 54 and nut 55. The crank is apertured to receive a bolt 56 and carries a seat 57 for a winged nut 58 engaging the bolt. An indicator member 59, having a body portion also split, encircles the sleeve of the cam 37 and is clamped thereto by the bolt 60 and nut 61. Said member carries at one end a slot 62, in which the bolt 56 is slidably mounted, and at the other end a scale 63, which, in cooperation with the pointer is designed to indicate to the user the required spacing between the pistons. As it may be noted from the foregoing the instrumentalities mentioned permit relative movement of one cam with the other, the cam 30, fixedly secured to the shaft, being rotatable with the crank, clampingly secured to the shaft, and the cam 37 being movable with the indicator member, clampingly secured to its sleeve. In Fig. 5, the pointer is shown as directed centrally of the scale. As it is moved from this point to the right, with the indicator member being held in a fixed position by one hand, the cam 30 will be advanced beyond the other cam, and, through the connections described, the spacing between the pistons will progressively increase, and obviously a reverse movement will serve to likewise decrease said spacing. Within the limits of the slot 62, the cam 37 may be moved to the right or left by moving the indicator member in said directions, thus affording an independent adjustment for the last-named cam, which will facilitate the adjustment of the pistons to their relative positions.

Assuming that the pistons have been adjusted to the positions desired for use, the winged nut 58 is then tightened in the slot so as to secure the pistons as well as the pointer in place and the crank in a fixed position, when both cams are ready to rotate as the crank is turned.

When the device is thus connected up and adjusted and a quantity of suitable dough placed in the hopper, it is ready to function as a doughnut machine, by mounting it in any appropriate way over a proper receptacle containing frying material, or, by utilizing the part of the body denoted 1 as a supporting handle, it may be manually held over said receptacle, the arm 5 resting thereon.

A turn or two of the cam driving mechanism will cause the pistons to contact with the dough so that the circumferential groove 23 in the piston 22 will become filled therewith, the same serving the purposes of a piston ring and affording a close connection between said piston and the piston cylinder.

When said cams are adjusted as described and the pistons disposed in the upper limits of their movement, the piston 22 should be located in the upper portion of said cylinder, as shown by dotted lines in Fig. 6, and the elongated piston should occupy a position in the sleeve and above the cylinder about as indicated in Fig. 2. On the rotation of the cams by the driving mechanism, the connections heretofore described will cause the piston 22, as it travels from said position in the cylinder to a point adjacent the lower end thereof, to exert a suction effect on the dough, thus drawing from the hopper and into the cylinder the required quantity thereof. The elongated piston, having partially left the sleeve, is then forced through the adjacent dough and into the cylinder, by the connections which have been described, the two pistons retaining said dough between them. The pistons now continue their movement in the cylinder until the piston 22 has passed out of the free end thereof, causing an opening between said end and the top of said piston. When the required opening has been attained, the piston 22 comes to a rest for an interval and the elongated piston, continuing to travel in the cylinder, forces a round section of dough 70 through said opening, as indicated in Fig. 6. When the necessary quantity of dough has been thus expelled from the cylinder, the elongated piston stops in its downward movement, and said pistons now start upwardly, the piston 22 entering the cylinder, and in cooperation with the flange 23 thereof, an annular section of dough, suitable for a doughnut, is cut off and drops into the receptacle for cooking. Said pistons then rise through the cylinder until the elongated piston passes out of said cylinder and returns to the sleeve, and the respective pistons occupy the positions as first indicated, when a repetition of this cycle of operation will produce a like result.

Under the construction disclosed in my copending application, heretofore referred to, and wherein I provided a pair of disclike pistons for forming a raw doughnut, during the making of said doughnut, dough from the hopper would follow the upper piston down into the cylinder, and when said piston returned to the hopper said dough would be drawn from the cylinder back into the hopper, with the consequent disadvantages heretofore mentioned. In the present device the elongated piston does not wholly leave the sleeve, and when its lower end is disposed in the cylinder, it acts as a barrier between the dough in the hopper and the cylinder, with the result that no dough can follow said piston into the cylinder, but is kept within its place in the hopper, as indicated in Fig. 6. During these movements it slides through the dough without carrying any on top of it, and when the piston returns to its neutral position within the sleeve, it will slide through the dough without subjecting it to the kneading and manipulation incident to the other construction. Said sleeve also encloses the piston rods, and in thus separating them from the dough in the hopper the action of the pistons is made lighter and the dough is not subjected to the action resulting from their movements.

From the foregoing description of the mode of operation of the device it may be noted that the cams impart to the cam arms, through the rollers connected therewith and which are mounted in and adapted to follow the cam grooves, certain movements, which, through the connections provided, are communicated to the pistons. As will be evident, if the grooves of the respective cams were disposed in spaced alignment, that is, with the parts of one cam in register with the corresponding parts of the other cam, the movements imparted to the cam levers through the rollers and communicated to the pistons, by the connections described, would be equal at all times at any position of the crank, and the pistons would move in unison, with the consequence that the dough would be carried up and down in the cylinder, and there would be no expulsion thereof. Now by adjusting one of the cams so that one section of the groove is advanced a few degrees ahead of the like section in the other cam, it will be apparent that while one roller is in the last-named section at rest, the other roller is descending in its groove and imparting to the lower piston a movement which serves to draw dough into the cylinder. The other roller, on leaving the rest, then descends in its groove and imparts to the upper piston a downward movement which serves to carry dough between the pistons and expel the same from the cylinder while the first-named roller has come to a rest beyond the free end of said cylinder.

Said flange of the piston cylinder, provided as it is with a thin edge, performs a very useful function, in that it serves, in conjunction with the piston operating therewith, to make a clean central cut in said section of dough, and also prevents said section from clinging exteriorly of the cylinder.

The detachable piston cylinder permits another cylinder of a different diameter, with parts corresponding thereto, to be mounted to the hopper, and by installing a pair of pistons to accommodate said cylinder and a sleeve to fit the elongated one of the pair, which can be readily attached, doughnuts of different diameters may be made with this machine, at a comparatively small additional expense.

While I have shown one embodiment of my invention, I may, however, provide other arrangements and constructions for carrying out the invention without departing from the spirit or scope of the same as defined by the appended claims.

I claim:

1. In a doughnut machine having a hopper provided with a discharge port, a detachable piston cylinder communicating with the port and terminating in a discharge end, a piston sleeve disposed in the hopper and spaced away from the port, an elongated piston mounted in the sleeve, a disc-like piston spaced from the first-named piston, said pistons adapted to force dough from the hopper into the cylinder, and, in cooperation with said discharge end, deposit a raw doughnut from the cylinder, a shaft, driving mechanism therefor, a cam fixedly secured to the shaft, a second cam, rotatable on the shaft, means detachably secured to the second cam and the driving mechanism to permit rotation of the second cam with the shaft, and whereby the cams may be relatively adjusted for regulating the spacing between the pistons and the quantity of dough to be acted upon in making the doughnut, and means for operatively connecting the cams with the pistons.

2. In a doughnut machine having a hopper provided with a discharge port, a detachable piston cylinder communicating with the port and terminating in a discharge end, a piston sleeve disposed in the hopper and spaced away from the port, an elongated piston mounted in the sleeve, a disc-like piston disposed in spaced relation with the first-named piston, said pistons adapted to force dough from the hopper into the cylinder, and, in cooperation with said discharge end, deposit an annular section of dough from the cylinder, means for adjusting the spacing between the pistons for regulating the quantity of dough to be acted upon in making said section, driving mechanism for the pistons, and means for operatively connecting the pistons with said mechanism.

3. In a doughnut machine having a piston cylinder, and a pair of spaced pistons for forcing dough through the cylinder, a shaft, a grooved cam rotatable with the shaft, a second grooved cam having a sleeve rotatable on the shaft, means for operatively connecting the cams with the pistons, means for adjusting the cams to regulate the quantity of dough to be forced through the cylinder, comprising a crank, carrying at one end a handle and at the other end a pointer, said crank being apertured for embracing the shaft and provided with a kerf, means acting on the kerf for clamping the crank to the shaft, an indicator member having a body portion, carrying at one end a segmental slot and at the other end a scale, said portion being apertured for embracing the sleeve and provided with a kerf, means acting on the last kerf for clamping the member to the sleeve, and means for detachably securing the crank in the slot.

4. In a doughnut machine, a hopper for dough having a discharge end provided interiorly with a circumferentially extending and outwardly flared portion inwardly beveled, and a readily detachable piston cylinder having at one end a circumferentially extending portion exteriorly beveled and complementary to the first-named portion adapted to be secured operatively to the hopper solely by frictional engagement with said portion of the discharge end.

5. In a doughnut machine having a piston cylinder, and a pair of spaced pistons for forcing dough through the cylinder, a shaft, a grooved cam rotatable with the shaft, a second grooved cam having a sleeve rotatable on the shaft, means for operatively connecting the cams with the pistons, and means for adjusting the cams to regulate the quantity of dough to be forced through the cylinder, including a crank and a pointer clampingly engageable with said shaft, said crank carrying a handle, an indicator member clampingly engageable with said sleeve and carrying a segmental slot and a scale, and means for securing the crank in the slot and whereby said pointer may be selectively adjusted to said scale.

WALTER BELSHAW.